Figure 1:
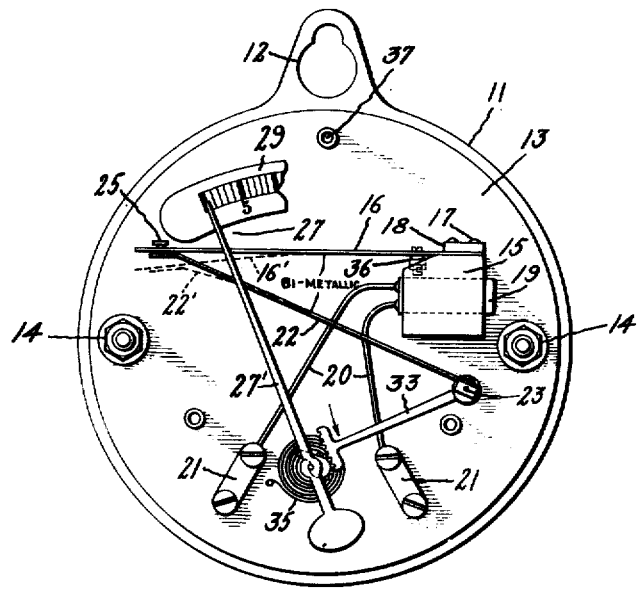

July 17, 1923. 1,462,337

C. I. HALL

ELECTRICAL INSTRUMENT

Filed April 13, 1920

Inventor:
Chester I. Hall,
by Albert G. Davis
His Attorney.

Patented July 17, 1923.

1,462,337

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

ELECTRICAL INSTRUMENT.

Application filed April 13, 1920. Serial No. 373,549.

*To all whom it may concern:*

Be it known that I, CHESTER I. HALL, a citizen of the United States, residing at Fort Wayne, county of Allen, State of Indiana, have invented certain new and useful Improvements in Electrical Instruments, of which the following is a specification.

My invention relates to electrical instruments and more particularly to electric current measuring instruments, and especially to electric current demand indicators for measuring and recording the demand, and particularly the maximum demand of an electric installation.

One of the advantages of my invention is to provide an improved construction for an instrument of the class above specified, so that the meter may be made to indicate accurately although constructed very simply. Another advantage of my invention is to provide reliable and simple compensating means in an instrument adapted to operate in response to electrothermal influences.

In instruments heretofore built adapted to operate in response to the heating effect of an electric current, the problem of compensating accurately for the effect of variations in the atmospheric temperature has always been somewhat difficult. In the type of instrument illustrated in my former Patent 1,190,157, granted July 4, 1916, which shows a maximum demand indicator functioning in a manner analogous to the instrument embodying my present invention, accurate compensation may be had, but the construction is not very simple for accomplishing this result. In that instrument the essential elements comprise two spirally wound strips of bi-metallic thermostatic metal, adapted to operate differentially upon the indicator of the instrument. One of said thermostatic elements is adapted to be in thermal connection with a large mass supplied with heat proportionately to the load supplied, while the other one is the compensating element for taking care of variations in atmospheric temperature. It has been found that with such a construction it is comparatively difficult to wind the thermostatic elements into true spirals, and furthermore it is difficult to match two of these elements so that one may accurately compensate the other. This is due to the fact that absolute uniformity in the material used cannot be obtained. The results may be that the indicator does not indicate accurately the quantity it is supposed to measure, unless comparatively great care is taken in matching the spirals. Another disadvantage is that it is difficult to adjust the indicator to zero position, so that when there is no current flow, the instrument should always return to the zero mark.

My invention makes it possible to do away with the objectionable spirally wound members. As a substitute for these members I employ flat spring bi-metallic members that are adapted to be bowed in response to variations in their thermal condition. The great advantage of this construction is that absolute uniformity of deflection may be obtained. It is also possible in the instrument of my present invention to adjust accurately for the zero position of the pointer, by mechanically flexing one or the other of the flat spring members.

Figure 2:
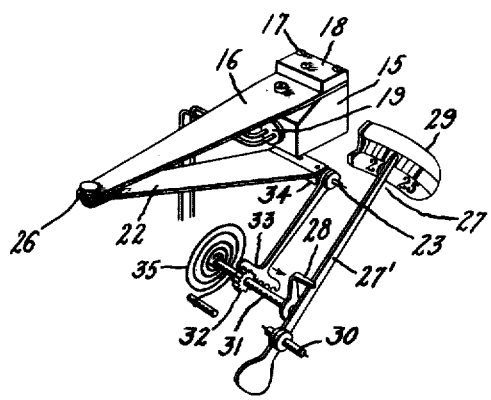

The construction and mode of operation of an electric current measuring instrument embodying my invention will be understood from the following description taken in connection with the accompanying drawings in which:

Fig. 1 is a front view of the instrument with the cover removed, showing how the operating parts are arranged; and Fig. 2 is a perspective view of the operating elements removed from the supporting base.

Referring now more in detail to the drawings in which like reference characters refer to like parts throughout, the entire instrument has a supporting frame 11 adapted to be appropriately supported, such as for example by means of the aperture 12. The operating parts of the instrument are supported on an insulating base 13 shown appropriately held to the frame 11 by means of the bolts and nuts 14.

The principle of operation of my invention is similar to that set forth in Patent 1,190,157, heretofore referred to, but for the sake of clarity I shall describe briefly how the instrument operates. In order to determine an equitable charge for the consumption of current in an electrical installation, I provide an indicating means that does not immediately respond to the current supplied to the load, but instead takes some appreciable time after the load is applied to obtain its full deflection. It has been found that the use of a member subjected to the heating effect of the electric current supplied to the load may be arranged so as to perform this function. In the present instance such an embodiment is shown wherein this result may be readily obtained.

In order to procure a comparatively large time lag between the time when the current supplied to the load is varied and the time when the instrument responds completely to the variation, there is utilized a heat storage mass 15 which stores the heat supplied to it and conducts it gradually to the thermostatic element operating the indicator of the instrument. The conduction of heat from the heat storage mass 15 to the thermostatic element takes some appreciable time. In my present invention the bi-metallic thermostatic element comprises a flat spring strip 16 made as long as the dimensions of the instrument permit, and placed in connection with the heat storage mass 15 and properly held thereto by the fastening devices 17 which clamp said strip 16 between the heat storage mass 15 and clamping block 18. It is to be noted that the heat storage mass 15 operates also as a support for the bi-metallic element 16; in fact if it were made of a sufficiently small mass the instrument might be utilized for indicating the instantaneous value of current in the same way as a hot wire instrument. The heat storage mass 15 has an aperture therethrough in which is fitted an electric heating cartridge 19 adapted to supply the heat to said mass. Said cartridge 19 is connected by leads 20 to the terminal posts 21 by means of which the instrument may be placed properly in the circuit so as to measure the desired quantity.

Some of the heat supplied to the heat storage mass 15 is gradually conducted to the bi-metallic spring member 16 which becomes bowed in response to the variation of its thermal conditions. Upon an increase in its temperature the member 16 takes up some such position as is denoted by the dotted line 16'. The movement of the free end of this member 16 is appropriately utilized to actuate the pointer of the instrument. The means that I employ for performing this function will be described more in detail later on. It is evident that in order to obtain a reliable and accurate instrument, it is necessary that the effect of the variations in atmospheric temperature be nullified. I accomplish this result by the use of a second bi-metallic spring element 22, having substantially the same physical proportions as the element 16, so that their thermal properties are similar, and whatever flexing effect the atmospheric temperature has upon one of the members it will have precisely the same effect upon the other. Highly important results of this construction for the compensation are that both bi-metallic elements are long, flat strips, easy to manufacture, and the deflection due to the change in the thermal conditions may be accurately calculated, in contradistinction to the old form of spiral spring in which the deflection depends not only upon the developed length and thickness of the spring, but upon the tension with which the spring is wound, as well as upon many other factors. The compensating member 22 is pivoted at 23 and is free to rotate about said pivot. This member is arranged in such a way that increase in temperature will cause it to flex in a position shown by the dotted line 22'. The variations in the positions of members 16 and 22 under atmospheric temperature rise are greatly exaggerated in Fig. 1.

An appropriate indicating means is adapted to be actuated by the rotation of the compensating member 22 about its pivot 23, this rotation being due to the action of the bi-metallic element 16 at its free end upon said compensating member 22. In this way the compensating member 22 serves as one of the mechanical connecting means between the element 16 and the indicating means. The free ends of said members 16 and 22 are slidably connected together by means of a slot and pin construction, as clearly shown. The headed pin 25 is carried by one of these two members and works in a slot 26 in the other of the members. In this way the flexure of the free end of the member 16 is mechanically transmitted to the free end of member 22. The temperature of the surrounding atmosphere it is to be noted has exactly the same effect on both members 16 and 22, so that if there be no current flowing in the circuit at all, if the member 16 be flexed, due to a rise in atmospheric temperature, the member 22 will be bowed an equal amount. It is evident from the figure that this results in non-rotation of said member 22 about its pivotal support 23. This method of compensation is extremely simple and accurate.

The indicator 27 is adapted to indicate the maximum equivalent demand and comprises a non-return pointer 27' actuated by driving dog 28 operatively related to the thermostatic element 22. It is evident that the driving dog itself may be replaced by an indicating pointer so as to indicate the instantaneous value of the demand. An appropriately calibrated scale 29 cooperates with pointer 27' which is pivoted at 30. The mechanical relation of the indicator to the compensator will now be described. The dog 28 driving said pointer 27' is carried on a shaft 31 adapted to be rotated in response to rotation of the member 22. This is accomplished by a pinion 32 secured to said shaft 31 and meshing with a segment 33 mechanically connected to the block 34, fastened to the pivoted end of member 22, and serving as a bearing therefor, said segment 33 rotating about pivot 23 as a center. It is evident that when the free end of member 22 is depressed in response to a flexure of the bi-metallic member 16, the gear segment 33 is rotated in the direction shown by the arrow. This movement causes rotation of the driving dog in a clockwise direction, and if the driving dog is rotated further than it has been rotated subsequent to the last setting of the indicator 27, it will drive said indicator past its former position. In order to maintain the free ends of members 16 and 22 always in contact, a comparatively fine helical spring 35 is wound around the shaft 31 and is made just strong enough to maintain these free ends in mechanical connection, and to balance the mechanical friction of the moving parts.

One of the great advantages of my invention is the ease with which the zero point of the indicator 27 may be adjusted. This adjustment comprises means for mechanically flexing one or the other of the two members 16 or 22, in this case shown as member 16. A micrometer adjusting screw 36 appropriately tapped into the heat storage mass 15 has a shoulder bearing against the under side of the member 16. By turning the head of said adjusting screw a flexing force is applied to the flat member 16. When once adjusted for its zero position, the instrument will maintain it for good and all, unless some outside disturbing influence is brought into play.

An enclosing cover not shown may be appropriately supported over the operating parts of the instrument by making use of the tapped holes 37 in the insulating base 13.

From the foregoing description it is seen that I have provided an extremely compact, inexpensive and efficient instrument for performing the desired functions. While I have shown one embodiment of my invention, it is not limited thereto and I aim to cover in the appended claims all modifications falling fairly within the scope of my invention.

What I claim as new and desire to secure by Letters Patent of the United States, is,—

1. An electrical instrument comprising a pair of flat bi-metallic members adapted to be bowed in response to a variation in thermal conditions, a support for one of said members near its end, a pivotal support for the other of said members near its end, an electric heating coil for one of said members, said members being so proportioned and arranged that the pivotally mounted member rotates in response to a difference in their thermal conditions, and means for indicating the rotation of said pivotally mounted member.

2. An electric instrument comprising a flat, substantially straight, bi-metallic member fixed at one end and adapted to be flexed by the heating effect of an electric current indicating means for measuring said effect, and another flat bi-metallic member having one end pivoted and the other end in mechanical contact with the free end of said first mentioned member for transmitting said effect to said indicating means and for compensating for the effect of changes in atmospheric temperatures on said first mentioned member.

3. An electric instrument comprising a flat, substantially straight, bi-metallic member fixed at one end adapted to be bent by the heating effect of an electric current, indicating means for measuring said effect and means comprising a similar bi-metallic member pivoted at one end and having its other end in contact with said first mentioned member for compensating the atmospheric temperature changes and for operating said indicating means.

4. An electrical instrument comprising an element, the configuration of which is varied in response to variations in its thermal condition, means for subjecting said element to the heating effect of an electric current, a pivoted member for compensating for the effect of changes in atmospheric temperature in mechanical contact with said element, and an indicator moved in response to the element and motion of said element and member.

5. In an electrical instrument, in combination, a heat storage mass, a flat bi-metallic member having one end in thermal connection with said mass, means for subjecting said heat storage mass to the heating effect of an electric current, means for compensating for the effect of changes in atmospheric temperature, an indicator operatively related to said bi-metallic member and said temperature compensating means, and means for mechanically flexing said bi-metallic member whereby the zero position of said indicator may be adjusted.

6. In an electrical instrument, in combination, a heat storage mass, a flat bi-metallic member having one end in thermal connection with said mass, means for subjecting said heat storage mass to the heating effect of an electric current, another flat bi-metallic member having substantially the same dimensions as said first mentioned member, a pivotal support at one end for the second mentioned member, the free ends of the members being slidably connected, and so arranged that a variation in atmospheric temperature causes flexures of both members in such a direction that its tendency to rotate the pivotally mounted member is neutralized, and indicating means operatively connected to said members.

7. In an electrical instrument, in combination, a heat storage mass, a flat bi-metallic member having one end in thermal connection with said mass, means for subjecting said heat storage mass to the heating effect of an electric current, another flat bi-metallic member having substantially the same dimensions as said first mentioned member, a pivotal support at one end for the second mentioned member, the free ends of the members being slidably connected, and so arranged that a variation in atmospheric temperature causes flexures of both members in such a direction that its tendency to rotate the pivotally mounted member is neutralized, an indicator operatively related to said bi-metallic members, and means for mechanically flexing one of said bi-metallic members to adjust the zero position of said indicator.

8. In an electrical instrument, in combination, a heat storage mass, a flat bi-metallic member having one end in thermal connection with said mass, means for subjecting said heat storage mass to the heating effect of an electric current, another bi-metallic member arranged to compensate for the effect of variations in atmospheric temperature, an indicator operatively related to said bi-metallic members, and means for mechanically flexing one of said bi-metallic members whereby the zero position of said indicator may be adjusted.

In witness whereof, I have hereunto set my hand this eighth day of April, 1920.

CHESTER I. HALL.

Certificate of Correction.

It is hereby certified that in Letters Patent No. 1,462,337, granted July 17, 1923, upon the application of Chester I. Hall, of Fort Wayne, Indiana, for an improvement in "Electrical Instruments," errors appear in the printed specification requiring correction as follows: Page 3, line 90, claim 3, for the article " the " read *for;* same page, line 102, claim 4, strike out the words " element and ", both occurrences; and that the said Letters Patent should be read with these corrections therein that the same may conform to the record of the case in the Patent Office.

Signed and sealed this 11th day of September, A. D., 1923.

[SEAL.]

KARL FENNING,
*Acting Commissioner of Patents.*